United States Patent
Kataoka

(10) Patent No.: US 9,613,191 B1
(45) Date of Patent: Apr. 4, 2017

(54) ACCESS TO AN ELECTRONIC ASSET USING CONTENT AUGMENTATION

(71) Applicant: INTERNATIONAL BUSINESS MACHINES CORPORATION, Armonk, NY (US)

(72) Inventor: Katsuhisa Kataoka, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/943,753

(22) Filed: Nov. 17, 2015

(51) Int. Cl.
*G06F 21/10* (2013.01)
*H04L 29/06* (2006.01)

(52) U.S. Cl.
CPC .......... *G06F 21/105* (2013.01); *H04L 63/101* (2013.01); *H04L 63/20* (2013.01)

(58) Field of Classification Search
CPC ...... H04L 63/101; H04L 63/20; G06F 21/105
See application file for complete search history.

(56) References Cited

U.S. PATENT DOCUMENTS

| | | | |
|---|---|---|---|
| 8,103,535 B2 | 1/2012 | Grabarnik et al. | |
| 8,954,988 B1 | 2/2015 | Laredo et al. | |
| 2007/0083474 A1* | 4/2007 | Burkhart | G06Q 10/10 705/59 |
| 2009/0094041 A1* | 4/2009 | Buss | G06Q 30/06 705/1.1 |
| 2010/0306115 A1* | 12/2010 | Hardt | G06Q 10/10 705/80 |
| 2011/0093402 A1* | 4/2011 | Gupta | G06F 21/10 705/317 |
| 2014/0330553 A1 | 11/2014 | Aratsu et al. | |
| 2015/0066784 A1* | 3/2015 | Powers | G06Q 50/18 705/311 |
| 2015/0088595 A1 | 3/2015 | Chillar et al. | |

FOREIGN PATENT DOCUMENTS

JP 2015064877 A 4/2015

OTHER PUBLICATIONS

Choudhary, V., "Software as a Service: Implications for Investment in Software Development," in System Sciences, 2007. HICSS 2007, pp. 209a-209a, Jan. 2007.*

(Continued)

*Primary Examiner* — Robert Leung
(74) *Attorney, Agent, or Firm* — Isaac J. Gooshaw; George S. Blasiak; Heslin, Rothenberg, Farley & Mesiti

(57) ABSTRACT

Methods, computer program products, and systems are presented and can include for instance: crowdsourcing data from a plurality of users via a computer network, the data including feedback data regarding digital rights click through documents, wherein each of the users is a party to at least one of the digital rights click through documents; storing the data obtained by the crowdsourcing into a digital rights history repository; examining a digital rights click through document of a certain user, wherein the digital rights click through document controls access to a digital asset, wherein the examining includes using at least a portion of the feedback data of the digital rights history repository; and augmenting content of the digital rights click through document based on a result of the examining.

20 Claims, 11 Drawing Sheets

| ID | Term of use (Body) | Reputation Results | Accept / Reject Results | Information |
|---|---|---|---|---|
| S1 | GNU GENERAL PUBLIC LICENSE Version 3, 29 June 2007 Copyright © 2007 Free Software Foundation, Inc. <http://fsf.org/> Everyone is permitted to copy and distribute verbatim copies of this license document, but changing it is not allowed.... | No Problem: 90 With Caution: 10 Got Problem: 1 | Accepts: 100 Rejects: 1 | http://www.gnu.org/licenses/gpl-faq.en.html |
| S2 | ... | ... | ... | ... |

(56) References Cited

OTHER PUBLICATIONS

"EULA abstraction and presentation relative to previously accepted," IP.com No. IPCOM000211125D, published Sep. 21, 2011, accessed Feb. 1, 2016 at [https://priorartip.com/Ipcom/000211125].*

"Technique for Analyzing Terms and Conditions in License for User Acceptance using Natural Language Processing," IP.com No. IPCOM000239300D, published Oct. 28, 2014, accessed Feb. 1, 2016 at [https://priorartip.com/IPCOM/000239300].*

Muhammad Asfand-E-Yar; A Min TJOA; Using Semantic Web to Enhance User Understandability for Online; IFIP International Federation for Information Processing 2013 Jan. 2013.

Vukovic, M.; Laredo, J.; Rajagopal, S.; API Terms and Conditions As a Service; 2014 IEEE International Conference on Services Computing Jan. 2014.

Mel, Peter; Grance, Timothy; The NIST Definition of Cloud Computing; NIST Special Publication 800-145; Sep. 2011.

USPTO Global Dossier Report for Japanese Publication No. JP2015064877A, Report Generated from <http:/globaldossier.uspto.gov/> Oct. 3, 2016.

\* cited by examiner

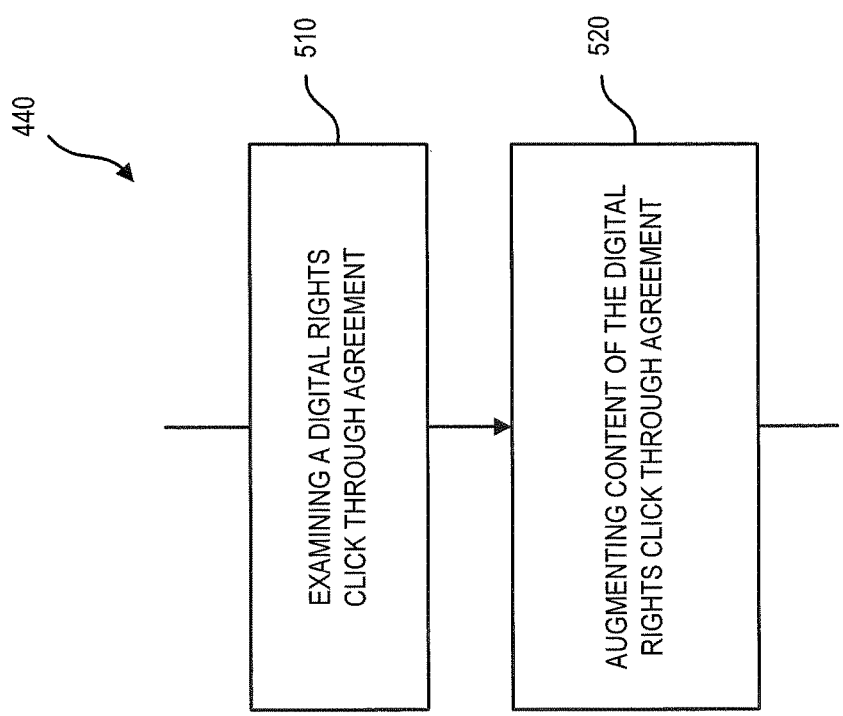

| # | Term of use ID | Result | Date | Comment |
|---|---|---|---|---|
| P1 | S1 | Accept | 2015/11/04 | To use XXX SW tool. |
| P2 | ... | ... | ... | ... |

*FIG. 6*

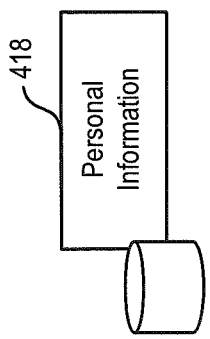

Personal Information 418

| ID | Term of use (Body) | Reputation Results | Accept / Reject Results | Information |
|---|---|---|---|---|
| S1 | GNU GENERAL PUBLIC LICENSE Version 3, 29 June 2007 Copyright © 2007 Free Software Foundation, Inc. <http://fsf.org/> Everyone is permitted to copy and distribute verbatim copies of this license document, but changing it is not allowed..... | No Problem: 90 With Caution: 10 Got Problem: 1 | Accepts: 100 Rejects: 1 | http://www.gnu.org/licenses/gpl-faq.en.html |
| S2 | ... | ... | ... | ... |

4202 ← Reputation Results
4204 ← Accept/Reject Results

*FIG. 7*

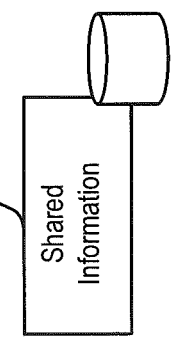

Shared Information 420

US 9,613,191 B1

ACCESS TO AN ELECTRONIC ASSET USING CONTENT AUGMENTATION

TECHNICAL FIELD

The present disclosure in the field of computer security relates a digital rights click through document for control of access to an electronic asset and more particularly to a content augmentation feature for a digital rights click through document.

BACKGROUND

In the field of computer security, rights of a party seeking to obtain access to digital content are often contingent on the party agreeing to terms and conditions of a computer software license. Digital rights computer click through documents are generally characterized by one or more agree button presented to an asset access receiving party to indicate ascension by a receiving party to a provision of a click through document or to an overall click through document.

Digital rights click through documents can be employed in the control of access to digital assets such as downloadable software and/or to on-line services.

Receiving digital content from an unscrupulous party in a computing environment can give rise to a myriad of problems including malware, breach of privacy and identity theft.

SUMMARY

The shortcomings of the prior art are overcome, and additional advantages are provided, through the provision, in one aspect, of a method. The method can include, for example: crowdsourcing, by one or more processor, data from a plurality of users via a computer network, the data including feedback data regarding digital rights click through documents, wherein each of the users is a party to at least one of the digital rights click through documents; storing, by the one or more processor, the data obtained by the crowdsourcing into a digital rights history repository; examining, by the one or more processor, a digital rights click through document of a certain user, wherein the digital rights click through document controls access to a digital asset, wherein the examining includes using at least a portion of the feedback data from the digital rights history repository; and augmenting, by the one or more processor, content of the digital rights click through document based on a result of the examining.

In another aspect, a computer program product can be provided. The computer program product can include a computer readable storage medium readable by one or more processing unit and storing instructions for execution by one or more processor for performing a method. The method can include, for example: crowdsourcing data from a plurality of users via a computer network, the data including feedback data regarding digital rights click through documents, wherein each of the users is a party to at least one of the digital rights click through documents; storing the data obtained by the crowdsourcing into a digital rights history repository; examining a digital rights click through document of a certain user, wherein the digital rights click through document controls access to a digital asset, wherein the examining includes using at least a portion of the feedback data from the digital rights history repository; and augmenting content of the digital rights click through document based on a result of the examining.

In a further aspect, a system can be provided. The system can include, for example a memory. In addition, the system can include one or more processor in communication with the memory. Further, the system can include program instructions executable by the one or more processor via the memory to perform a method. The method can include, for example: crowdsourcing data from a plurality of users via a computer network, the data including feedback data regarding digital rights click through documents, wherein each of the users is a party to at least one of the digital rights click through documents; storing the data obtained by the crowdsourcing into a digital rights history repository; examining a digital rights click through document of a certain user, wherein the digital rights click through document controls access to a digital asset, wherein the examining includes using at least a portion of the feedback data from the digital rights history repository; and augmenting content of the digital rights click through document based on a result of the examining.

The shortcomings of the prior art are overcome, and additional advantages are provided, through the provision, in one aspect, of a method. The method can include, for example: examining, by one or more processor, a digital rights click through document of a certain user, wherein the digital rights click through document controls access to a digital asset, wherein the examining includes using content of a digital rights history repository; and augmenting, by the one or more processor, content of the digital rights click through document based on a result of the examining.

In another aspect, a computer program product can be provided. The computer program product can include a computer readable storage medium readable by one or more processing unit and storing instructions for execution by one or more processor for performing a method. The method can include, for example: examining a digital rights click through document of a certain user, wherein the digital rights click through document controls access to a digital asset, wherein the examining includes using content of a digital rights history repository; and augmenting content of the digital rights click through document based on a result of the examining.

In a further aspect, a system can be provided. The system can include, for example a memory. In addition, the system can include one or more processor in communication with the memory. Further, the system can include program instructions executable by the one or more processor via the memory to perform a method. The method can include, for example: examining a digital rights click through document of a certain user, wherein the digital rights click through document controls access to a digital asset, wherein the examining includes using content of a digital rights history repository; and augmenting content of the digital rights click through document based on a result of the examining.

Additional features and advantages are realized through the techniques set forth herein. Other embodiments and aspects are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 5 is a flow diagram illustrating a method in accordance with an embodiment as set forth herein;

FIG. 6 is a diagram illustrating content of a personal repository in accordance with an embodiment as set forth herein;

FIG. 7 is a diagram illustrating content of a crowdsourced repository in accordance with an embodiment as set forth herein;

DETAILED DESCRIPTION

Figure 1:
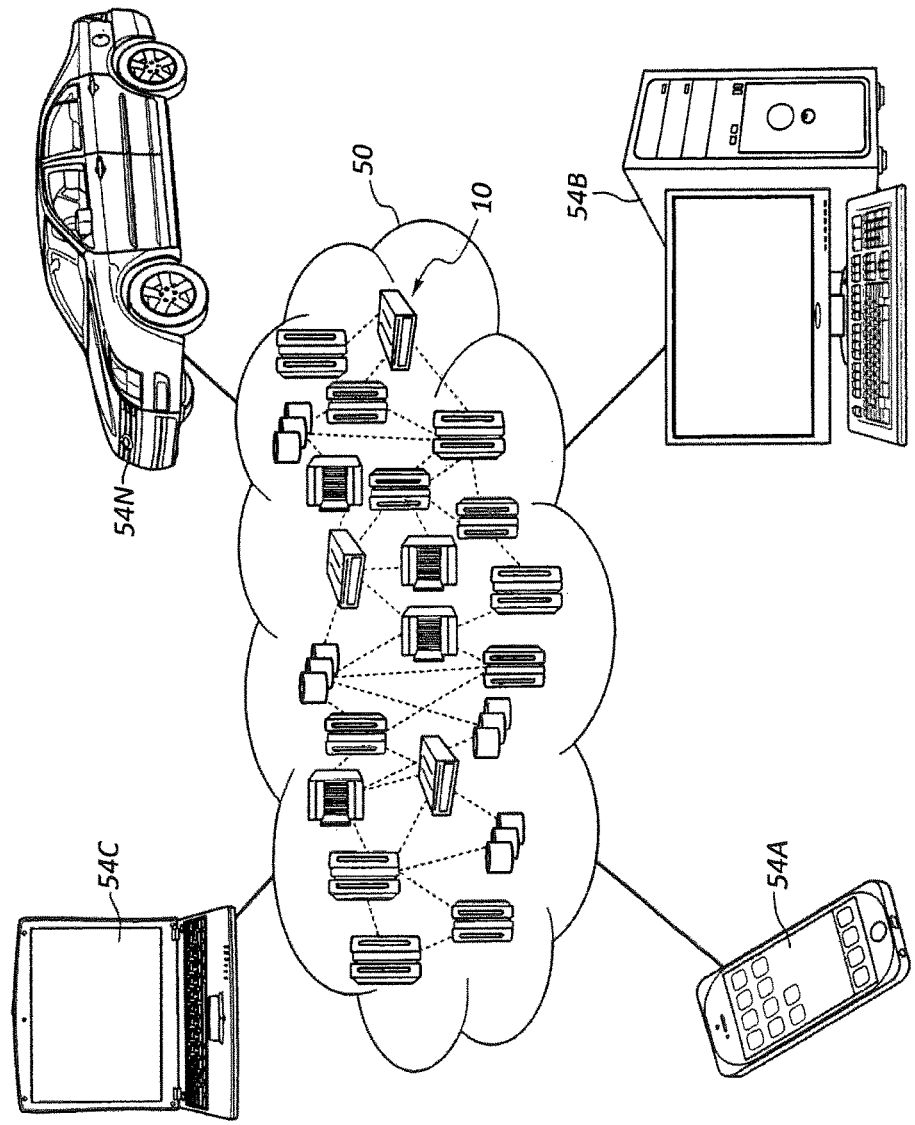
FIG. 1 depicts a cloud computing environment according to an embodiment as set forth herein.

Aspects of the present disclosure and certain features, advantages, and details thereof, are explained more fully below with reference to the non-limiting examples illustrated in the accompanying drawings. Descriptions of well-known materials, processing techniques, etc., are omitted so as not to unnecessarily obscure the disclosure in detail. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure.

Advantageously, the techniques disclosed herein allow for improved processing of digital rights click through documents. Where a present click through document has content dissimilar to a prior click through document of a digital rights history repository, a user can be made aware of this information.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
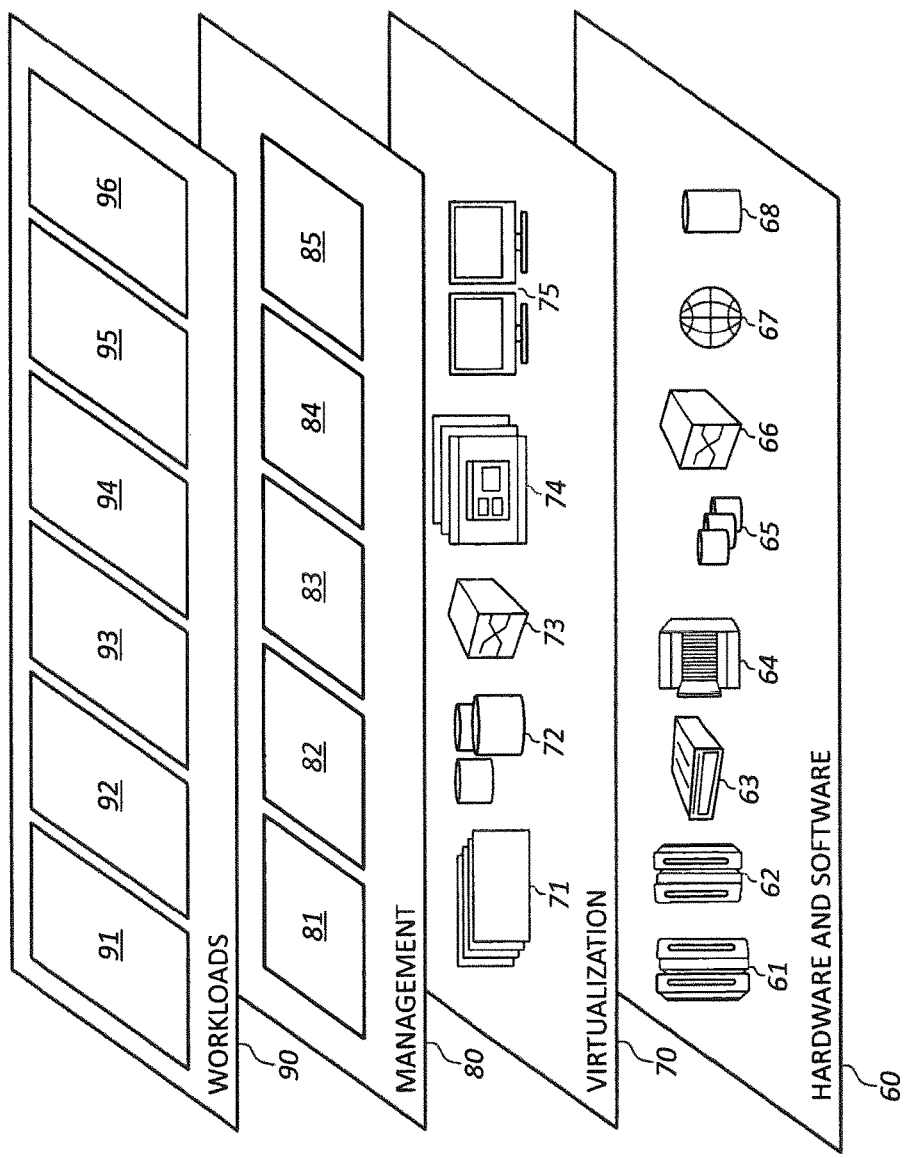
FIG. 2 depicts abstraction model layers according to an embodiment as set forth herein.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and digital rights click through document processing 96.

Figure 3:
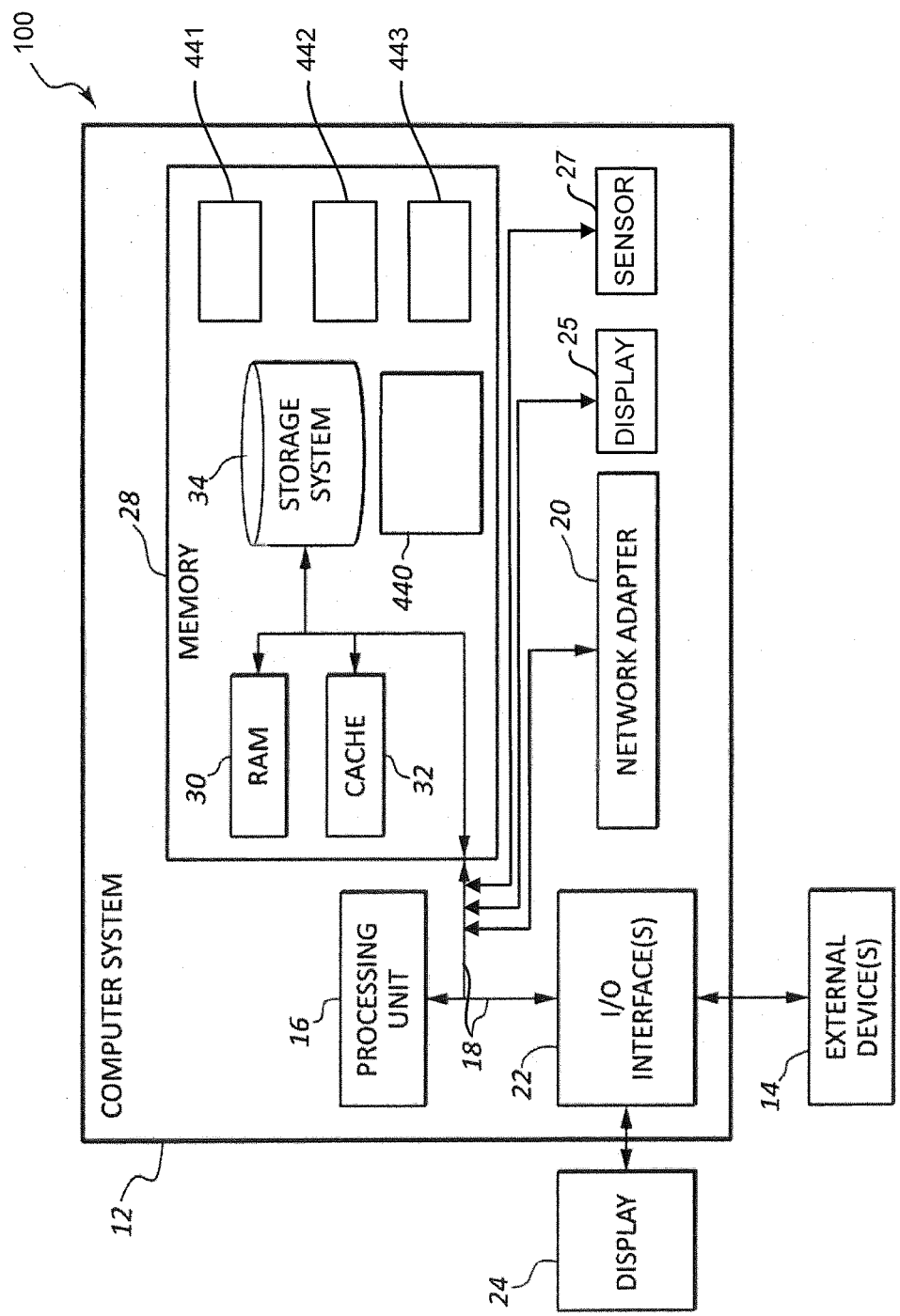
FIG. 3 depicts a hardware overview of a computing node, in accordance with an embodiment as set forth herein.

Referring now to FIG. 3, FIG. 3 depicts a hardware overview of a computing node 100, in accordance with an embodiment set forth herein. Computing node 100 is only one example of a suitable computing node and is not intended to suggest any limitation as to the scope of use or functionality of embodiments of the invention described herein. Regardless, computing node 100 is capable of being implemented and/or performing any of the functionality set forth hereinabove.

In one embodiment, computing node 100 can be provided as a cloud computing node 10 of a cloud computing environment 50 as set forth in reference to FIG. 1. In one embodiment, computing node 100 can be provided as a computing node of a computing environment other than a cloud computing environment.

In computing node 100 there can be provided a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices. Computer system 12 may be practiced in a non-distributed and/or non-cloud environment.

As shown in FIG. 3, computer system 12 in computing node 100 is shown in the form of a general-purpose computing device. The components of computer system 12 may include, but are not limited to, one or more processor 16, a system memory 28, and a bus 18 that couples various system components including system memory 28 to one or more processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one or more program (e.g., one or more program 440 and/or one or more program 441, 442, 443 as set forth herein) configured to carry out the functions of embodiments of the invention.

One or more program 440 having a set (at least one) of program modules, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. In place of or in addition to one or more program 440 memory 28 can store one or more additional one or more program, e.g., one or more program 441, 442, 443.

Computer system 12 may also communicate with one or more external devices 14 such as a keyboard, a pointing device, a display 24, etc. that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples include, but are not limited to: microcode, device vehicle operators, redundant processing units, external disk drive arrays, RAID systems, tape drives, and data archival storage systems, etc. In addition to or in place of having external devices 14 and display 24, which can be configured to provide user interface functionality, computing node 100 in one embodiment can include display 25 connected to bus 18. In one embodiment, display 25 can be configured as a touch screen display and can be configured to provide user interface functionality. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 100.

A representative one or more program of one or more program 440, 441, 442, 443 can have a set (at least one) of program modules, and may be stored in memory 28 by way of example, and not limitation, as well as an operating system, one or more application programs, other program modules, and program data. Each of the operating system, one or more application programs, other program modules, program data, and one or more program, or some combination thereof, may include an implementation of a networking environment. One or more program 440 (and optionally at least one program of one or more program 441, 442, 443) can generally carry out the functions and/or methodologies of embodiments of the invention as described herein. One or more program 440 (and optionally at least one program of one or more program 441, 442, 443) can include computer readable program instructions as are set forth herein that can be stored in a computer readable storage medium within a respective computing/processing device. In one embodiment a computer readable storage medium as set forth herein can be included in memory 28 as set forth in FIG. 3.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures for example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
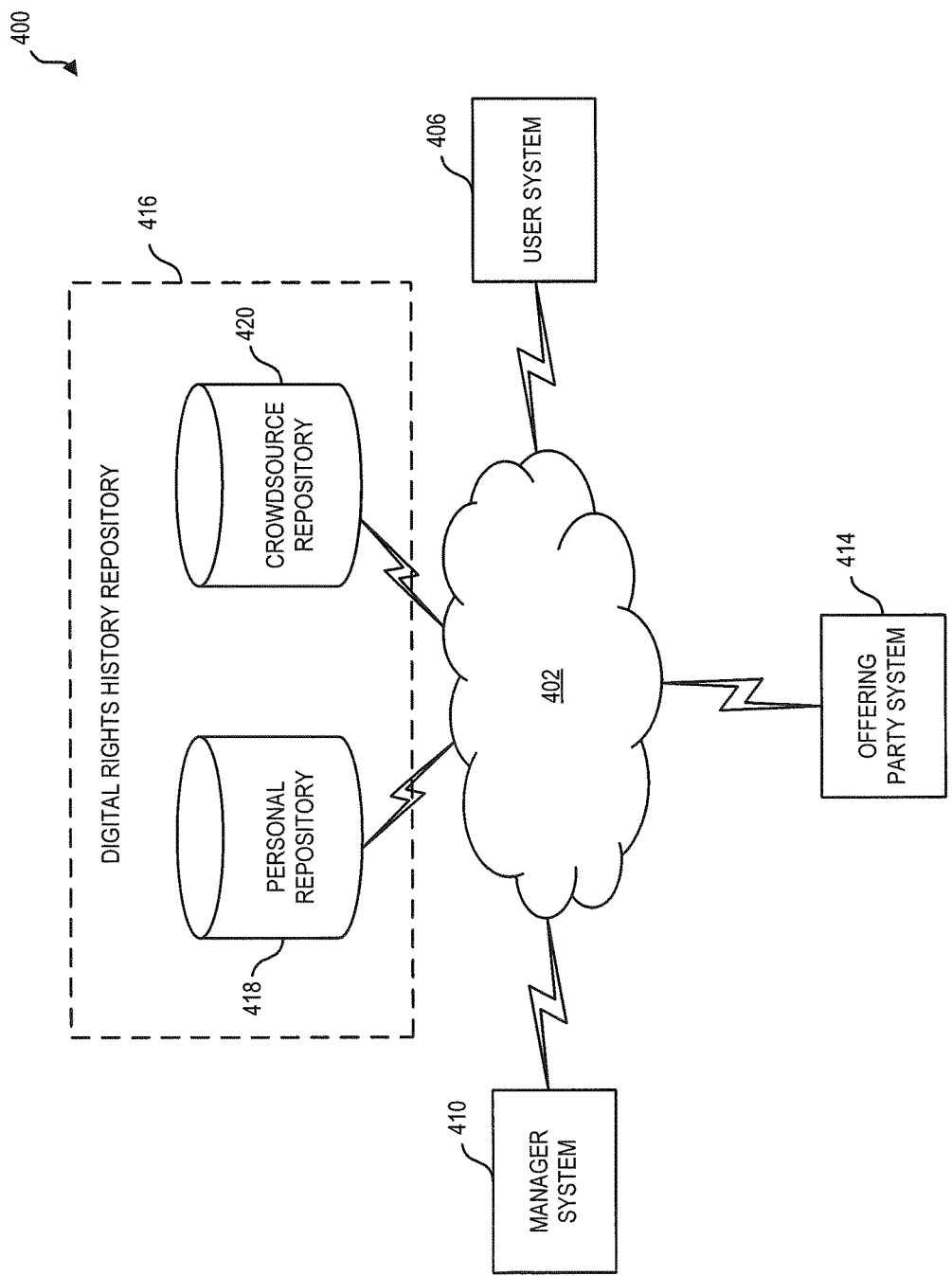
FIG. 4 is a block diagram of a system in accordance with an embodiment as set forth herein.

FIG. 4 is a block diagram of a system 400, in accordance with an embodiment as set forth herein. In the embodiment of FIG. 4, system 400 includes numerous devices, which may be or include computing nodes 100 as previously described, connected by a network 402. For example, network 402 may be a physical network or a virtual network. A physical network can be, for example, a physical telecommunications network connecting numerous computer nodes or systems, such as computer servers and computer clients. By contrast a virtual network can, for example, combine numerous physical networks or parts thereof into a logical virtual network. In another example, numerous virtual networks can be defined over a single physical network.

By way of explanation, FIG. 4 depicts an example environment. In one embodiment, system 400 can include a user system 406 and a manager system 410. In one embodiment system 400 can include an offering party system 414. In one embodiment, system 400 can include a digital rights history repository 416 having a personal 418 and a crowdsource repository 418. In one embodiment, manager system 410 can obtain content of a present click through document from offering party system 414 and can obtain content of one or more historical click through document from digital rights history repository 416. Each of user system 406, manager system 410, offering party system 414, and digital rights history repository 416 can include one or more computing node 100. Each computing node 100 can run one or more program. Shown as being external to manager system 410, digital rights history repository 416 including one or more of personal repository 418 or history repository 420 can alternatively be co-located with manager system 410. One or more program 440 which can run on one or more computing node 100 of manager system 410 can obtain information transmitted to manager system 410.

Regarding user system 406, user system 406 in one embodiment can include a computing node 100 provided by a client computer, e.g. a mobile device, laptop or PC that runs one or more program including a web browser for browsing web pages.

Regarding offering party system 414, offering party system 414 in one embodiment can include a computing node 100 provided by a web server that serves web pages having click through document content.

FIG. 5 is a flow diagram illustrating a method, in accordance with one or more aspects set forth herein. By way of example, the method described with respect to FIG. 5 can be performed using one or more program 440 running on one or more device e.g., of manager system 410 (FIG. 4) having one or more computing node 100 as described with respect to FIG. 3. In one embodiment, one or more program 440 can provide the functionality of digital rights click through agreement processing 96.

In the embodiment of FIG. 5, one or more program 440 at block 510 can perform examining a digital rights click through document. At block 520 one or more program 440 can perform augmenting content of the digital rights click through document based on a result of the examining In one embodiment, the digital rights click through document can be a document controlling access to a digital asset, e.g., software and/or an on-line service. In one embodiment, the digital rights click through agreement can have an agree button which in response to actuation by a user can permit access to the digital asset. In one embodiment, the digital rights click through document subject to examining at block 510 can be a document of a certain user, e.g., a user presented with the digital rights click through document, which document can include an agree button. In one embodiment, the examining can include comparing content of the click through document with content of a digital rights history repository. In one embodiment a representative digital rights agreement document of history repository 416 can have a signed/rejected status.

In one embodiment, one or more program 440 can provide a technique for agreeing to terms of use that allows correct understanding with less load through analysis and comparison of history of digital rights click through document contents.

Embodiments herein recognize that when software or a service is newly used, users are requested to "agree" to "terms of use." Embodiments herein recognize that with the expansion of online available software and services the number of occasions in which users are requested to agree to terms of use, such as provision of services using a network, is estimated to increase more than ever in the future.

Embodiments herein recognize that terms of use and general conditions are generally lengthy, difficult to understand, and it is hard to grasp contents easily and accurately. As a result, users often cannot help but conclude digital rights click through document provisions are acceptable without fully understanding the contents.

Based on the premise that documents of terms of use are lengthy and difficult to understand, embodiments herein are intended to make offered digital rights click through documents with terms of use easy to understand.

Embodiments herein recognize that at present, a scheme is generally used in which terms of use are displayed e.g. as a Web page and the user's intention of "agreement" is expressed using an agree button, e.g., a check box, button with appropriate text, or the like.

Embodiment herein recognize that according to one present scheme for encouraging careful review of a digital rights click through document, the agreement button is deactivated until all terms of use are displayed, but embodiments herein recognize that cases are rarely observed where measures are taken to reduce the user's burden of reading hard-to-understand terms of use.

One more program 440 performing augmenting at block 520 can take on various forms. In one embodiment the augmenting can include outputting information, e.g., by triggering display of information, e.g., by establishing program code for display of information. The information can include, e.g., information resulting from a comparison between digital rights click through documents, statistical information on digital rights click through documents corresponding to the document being examined, and/or reputation information on digital rights click through documents corresponding to the document being examined. In one embodiment a digital rights click through document corresponding to the document being examined can refer to a document in common with the document being examined. In one embodiment a digital rights click through document corresponding to the document being examined can refer to a document having a similarity to the document being examined according to a predetermined criteria.

In one embodiment, to perform examining a digital rights click through document at block 510 one or more program 440 can obtain a current digital rights click through document, e.g., from offering party system 414, and can compare content of a current digital rights click through document to content of one or more prior digital rights click through document of digital rights history repository 416.

Content of digital rights history repository 416 can include personal repository 418 and/or crowdsource repository 420. Personal repository 418 can include, e.g., digital rights click through documents that the user has signed (accepted, agreed) or not signed (rejected) in the past and/or additional information, e.g., reputation information on such documents. Crowdsource repository 420 can include, e.g., digital rights click through documents that other users (users of system 400 other that the user using user system 406) have signed or not signed and/or additional information e.g., reputation information on such documents.

In one embodiment, one or more program 440 at block 510 to perform examining can perform comparing terms and conditions of a current digital rights click through document to be signed or rejected by a user with terms and conditions of one or more click through agreement of digital rights history repository 416. In one embodiment one or more program 440 at block 520 to perform augmenting can output useful information resulting from such comparing before actual signing of the current document, such as similarity with and difference (if any) from the past click through documents, and the fact whether the user actually signed (agreed) to the similar digital rights click through documents in the past. At block 520 one or more program 440 can use content of a personal repository 418 and/or crowdsource repository 420. Crowdsource repository 420 can include information on one or more digital rights click through document of other users (users of system 400 other than user of a user system 406).

In one embodiment, one or more program 440 to perform examining at block 510 can perform examining using other user content of a crowdsource repository 420 of the digital rights history repository 416, the other user content being obtained from one or more user other than a certain user presented with the document being subject to examining In one embodiment, such other user content can be provided by one or more prior digital rights click through document. In one embodiment, such other user content can be provided by one or more reputation information item as is set forth herein, which reputation information can be obtained from users of system 400.

In one embodiment, one or more program 440 can be operative to use content of personal repository 518 in performing examining at block 510 unless at block 510 one or more program 440 at block 510 determines that personal repository 518 is absent a prior document corresponding to the document subject to examining at block 510. In one embodiment, one or more program 440 to perform examining at block 510 can use content of crowdsource repository 420 conditionally on the determination that there is no document in personal repository 418 corresponding to the document subject to examining at block 510. In another embodiment, one or more program 440 at block 510 can use content of personal repository 518 and/or crowdsource repository 420 by default without use of one or the other repository being conditional on a condition.

In one embodiment, one or more program 440 to perform examining at block 510 can perform analyzing events of one or more prior digital rights click through document corresponding to the digital rights click through document, and one or more program 440 to perform augmenting at block 520 can perform outputting a result of the analyzing of events in the form of, e.g., an event analysis result. Events can include e.g. a signing/rejecting event, or an entry of a reputation information item by a user of system 400. One or more program 440 at block 510 in performing examining can determine event analysis results, e.g., in the form of the number of users who signed or rejected one or more prior document corresponding to the document subject to examining at block 610, number of positive reputation scores of one or more prior document corresponding to the document subject to examining at block 610, or number of negative reputation scores of one or more prior document corresponding to the document subject to examining at block 610.

In one embodiment, one or more program 440 to perform examining at block 520 can perform examining to determine reputation information of one or more prior digital rights click through document corresponding to the digital rights click through document being subject to examining at block 510, and one or more program 440 to perform augmenting at block 520 can perform outputting the reputation information. In one embodiment one or more program 440 to perform examining at block 510 can locate in repository 416 one or more prior digital rights click through agreement corresponding to the document being subject to examining and can obtain reputation information stored for such documents. Reputation information can include, e.g., reputation information obtained from users of system 400.

Reputation information stored for a document of repository 416 can include e.g., reputation information on the document. For example, on a document being added to repository 416 or at any other time the user of the document can be presented with a reputation user interface allowing reputation information to be stored for the document. Reputation information on a document can include, e.g., information on problems, concerns, questions encountered by a user of the document. Reputation information on a document can include information on the document itself and/or information on the underlying service accessible by agreeing to terms of the digital rights click through document.

Reputation information stored for a document of digital rights history repository 416 can include, e.g., reputation information of users of system 400. In addition to having a signed/rejected status a representative document of digital rights history repository 416 can include, e.g., an associated user (the user that signed or rejected the document), an associated URL designating the location on the Internet where the document can be located, and a timestamp. One or more program 440 can determine a URL for a click through document by performing test searches for Internet documents having text strings of the document or by obtaining the URL from identifying information of a current Web browsing session. Reputation information on users of system 400 can be obtained from various sources, e.g., external public document services that record, e.g., criminal records and/or civil proceedings records, and/or reputation information provided by other users of system 400.

In one embodiment, one or more program 440 can be operative so that functions provided at block 510 and block 520 are active conditionally on the condition that a user registers with a service provided by system 400 (FIG. 4). In one embodiment functions provided at block 510 and block 520 can be provided as a members-only service on a network, e.g., a subscription based service. In one embodiment, a user of the service provided by system 400 can be permitted to use system 400 by agreeing to storage of a history of digital rights click through documents having terms of use (which may include conditions of use) in which the user himself/herself is a party to the digital rights click through document, determination on the terms of use (whether the user agrees thereto or not) and/or reputation in the form of evaluation information (whether the user recommends the digital rights click through document to other people or not). In one embodiment, system 400 can be operative so that conditionally on a user registering with a service, information presented to system 400 for storing in personal repository 418 can be shared between personal repository 418 and crowdsource repository 420.

In one embodiment, when agreeing to the terms of use of service provided by system 400 for registering a certain user into system, 400, a certain user presents content of a digital rights click through document of the certain user to system 400 and determines whether or not to agree thereto while receiving assistance from system 400. That is, system 400 can be operative to provide a demonstration of use of system 400 to a prospective registered user of system 400.

In one embodiment, system 400 can collect one or more (a) digital rights click through documents with terms of use and/or evaluation information thereof, and assist users of system 400 using that information. An example of a possible use of system 400 is provided herein in reference to (1) through (4) below. (1) A certain user logs in to the service provided by system 400 as set forth in reference to FIG. 4. Based on prior storing actions, system 400 can store in digital rights history repository 416 a history of past digital rights click through documents of the login certain user (in personal repository 418) and/or of other users (in crowdsource repository 420). (2) The certain user acquires a digital rights click through document having terms of use presented to the user (e.g., by display on a display 24 or 25 of a computing node 100) to which the certain user is considering agreeing and sends for examining by one or more program 440 the terms of use to the service provided by system 400 to which the user has logged in. In one embodiment Copy & Paste and uploading of files provided in, e.g., PDF or WORD format or the like can be used. In an alternative embodiment as set forth herein content of digital rights click through documents having of terms of use may also be presented more easily through direct linkage from a digital rights click through document target site. (3) The present system 400 and specifically one or more program 440 at block 510 to perform examining can compare content provided by the submitted terms of use of the current click through document with content provided by the terms of use agreed in the past of prior one or more click through document and searches similar ones. (4) The present system 400 and specifically one or more program 440 at block 520 to perform augmenting can establish program code to display on a display 24, 25 on a computing node 100 the comparison results in an easily understandable manner to the user. One or more program 440 can output comparison results, e.g., as follows (a) When substantially the same one exists, system 400 and specifically one or more program 440 at block 520 reports to the user saying "THESE TERMS ARE IDENTICAL TO YYY AGREED IN XX(MONTH), XX(YEAR), AND NO PROBLEMS HAVE BEEN RECORDED THEREAFTER (OR EVALUATION XXX PERFORMED ON YYY)." (b) When a similar one exists but differences also exist, system 400 and specifically one or more program 440 at block 520 reports to the user with a warning "THESE TERMS ARE SIMILAR TO YYY AGREED IN XX(MONTH), XX(YEAR), BUT ARE DIFFERENT IN THE FOLLOWING" and displays the differences. (c) When no similar one exists, system 400 and specifically one or more program 440 at block 520 reports to the user saying "YOU HAVE NEVER AGREED TO THIS TYPE OF TERMS IN THE PAST."

Since in one embodiment many digital rights click through documents having terms of use can be submitted to system 400, system 400 and specifically one or more program 440 at block 510 can perform examining by analyzing patterns and feedback reputation information obtained from other users of system 400 which patterns and reputation information can be stored in crowdsource repository 420, and thereby can provide the following exemplary analysis information (i), (ii) and (iii), and can thereby assist the user's determinations even in the case (c): (i) The number of users who have agreed to click through documents corresponding to the document subject to examination at block 510 and the number of users who have rejected click through documents corresponding to the document subject to examination. (ii) Information on reputation in cases where users encountered negative consequences as a result of agreement (iii) Links to information useful to well understand terms of use. Accordingly one or more program 440 in performing analyzing at block 510 can perform machine learning.

The user can determine whether or not to agree with reference to this augmented content in the form of information and reports the determination result to system 400.

The certain user may be allowed to input to system 400, e.g., reputation information and can provide comment such as on the reputation about a document (and/or associated software or service) the certain user agreed to in the past. Especially when the certain user regrets the agreement results, the certain user is motivated to input bad reputation against the document (and/or associated software or service), and therefore significant information is expected to be collected to digital rights history repository 416 of system 400.

As set forth herein one or more program 440 to perform examining at block 510 can perform a comparing between a document subject to examining at block 510 and one or more prior digital rights click through document of repository 416. In one embodiment, one or more program 440 to perform a comparing can perform a specified procedure, e.g., a specified procedure including (1) one or more program 440 processing a document to identify discrete terms; (2) one or more program 440 classifying discrete terms of a document into several patterns; (3) one or more program 440 attaching metadata to a document to label identified terms with pattern identifiers; and (4) one or more program 440 searching for matches between documents having common metadata identifiers.

FIG. 6 is a diagram illustrating content of personal repository 418 in accordance with an embodiment as set forth herein. System 400 can be operative e.g., so that responsively to a user (e.g., using user system 406) entering an input to sign or reject a digital rights click through document one or more program 440 stores a single row of data into personal repository 418 as illustrated in FIG. 6.

System 400 can be operative so that information of personal repository 418 can be shared between personal repository 418 and crowdsource repository 420. FIG. 7 is a diagram illustrating content of crowdsource repository 420 in accordance with an embodiment as set forth herein. In one embodiment as illustrated in FIG. 7, one or more program 440 performing examining at block 510 can perform analyzing of events of digital rights click through documents corresponding to a click through document being examined at block 510. Events can include, e.g., reputation entry events and/or accept/reject events. One or more program 440 can store one or more event analysis result that results from such analyzing of events in crowdsource repository 420 for each click through document of a set of click through documents identified as corresponding to a click through document determined to be corresponding. Even analysis results can include, e.g., a summary of reputation feedback information for a set of corresponding click through documents as illustrated by entry 4202, a summary of accept/reject results as illustrated by entry 4204. One or more program 440 for performing examining at block 510 where examining includes analyzing events can include reading result summary entries in the form e.g., of entry 4202 and/or entry 4204 and/or can include identifying click through documents of crowdsource repository 420 corresponding to a click through document being examined and analyzing raw row data entries shared from personal repository 418 into crowdsource repository 420, e.g., as shown in FIG. 6.

Figures 8, 9, 10:
FIG. 8 is a diagram illustrating an output provided by augmenting content in accordance with an embodiment as set forth herein.
FIG. 9 is a diagram illustrating an output provided by augmenting content in accordance with an embodiment as set forth herein.
FIG. 10 is a diagram illustrating an output provided by augmenting content in accordance with an embodiment as set forth herein.

In one embodiment, as set forth herein one or more program 440 in performing augmenting at block 520 can output various information. FIGS. 8-10 illustrate various outputs, e.g., for display on a display 24, 25 of a computing node 100 that can be provided by performance of augmenting at block 510.

The output of FIG. 8 illustrates an exemplary case where an examining at block 510 results in a determining that a prior document corresponding to the document examined at block 510 has been previously agreed to by the certain user.

The output of FIG. 9 illustrates an exemplary case where an examining at block 510 results in a determining that a prior document corresponding to the document examined at block 510 has been previously agreed to by the certain user, but that there are particular differences between the prior document and the document being examined.

The output of FIG. 10 illustrates an exemplary case where an examining at block 510 results in a determining that a prior document corresponding to the document examined at block 510 has not been previously presented to a certain user. In one embodiment in such case one or more program 440 in performing examining at block 510 can obtain content of crowdsource repository 420, and can output reputation information on the document as set forth herein.

Figure 11A:
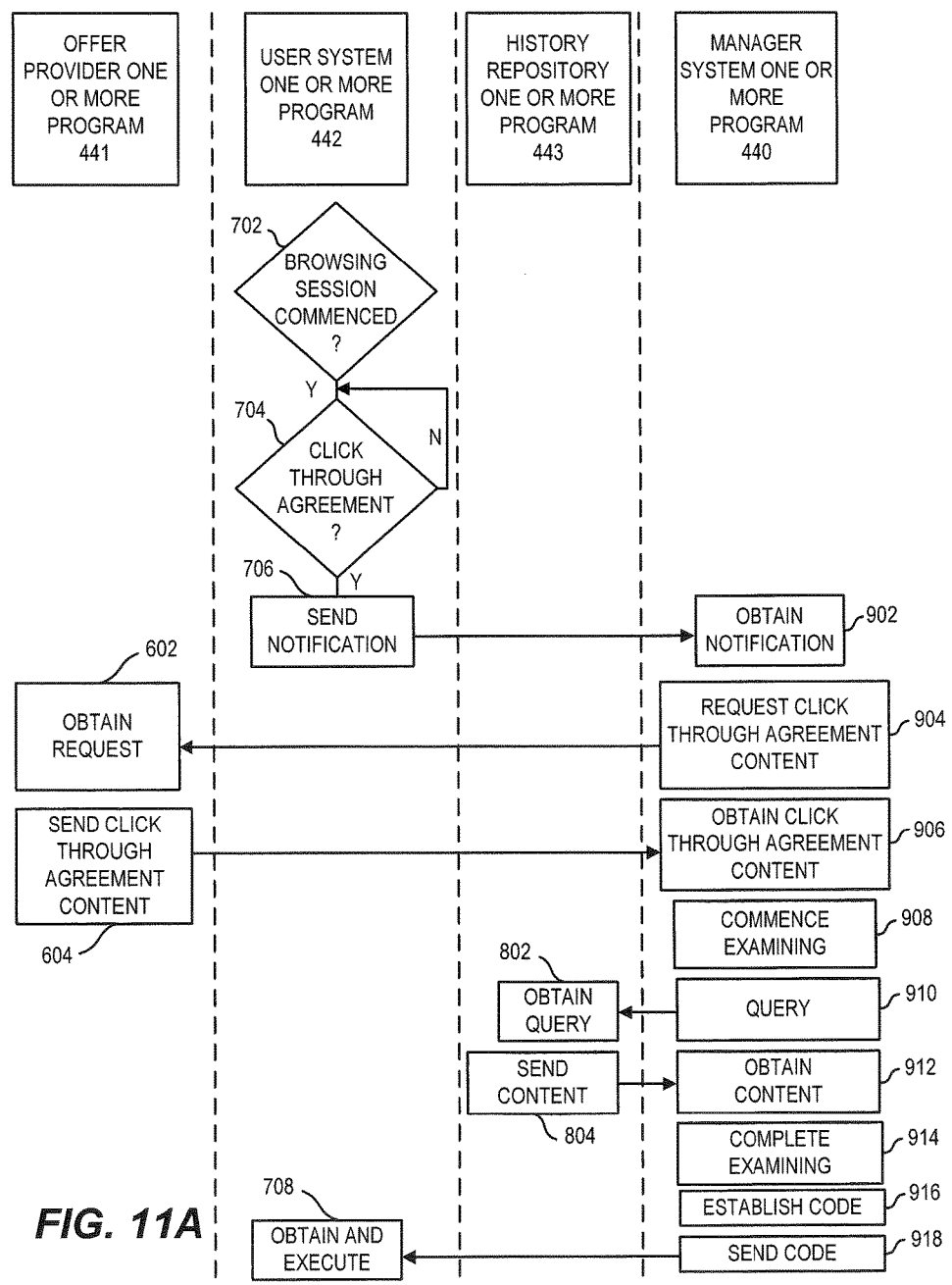
FIG. 11A-11B is a flow diagram illustrating further aspects of a method for augmenting content of a digital rights click through document in accordance with an embodiment as set forth herein.
Figure 11B:
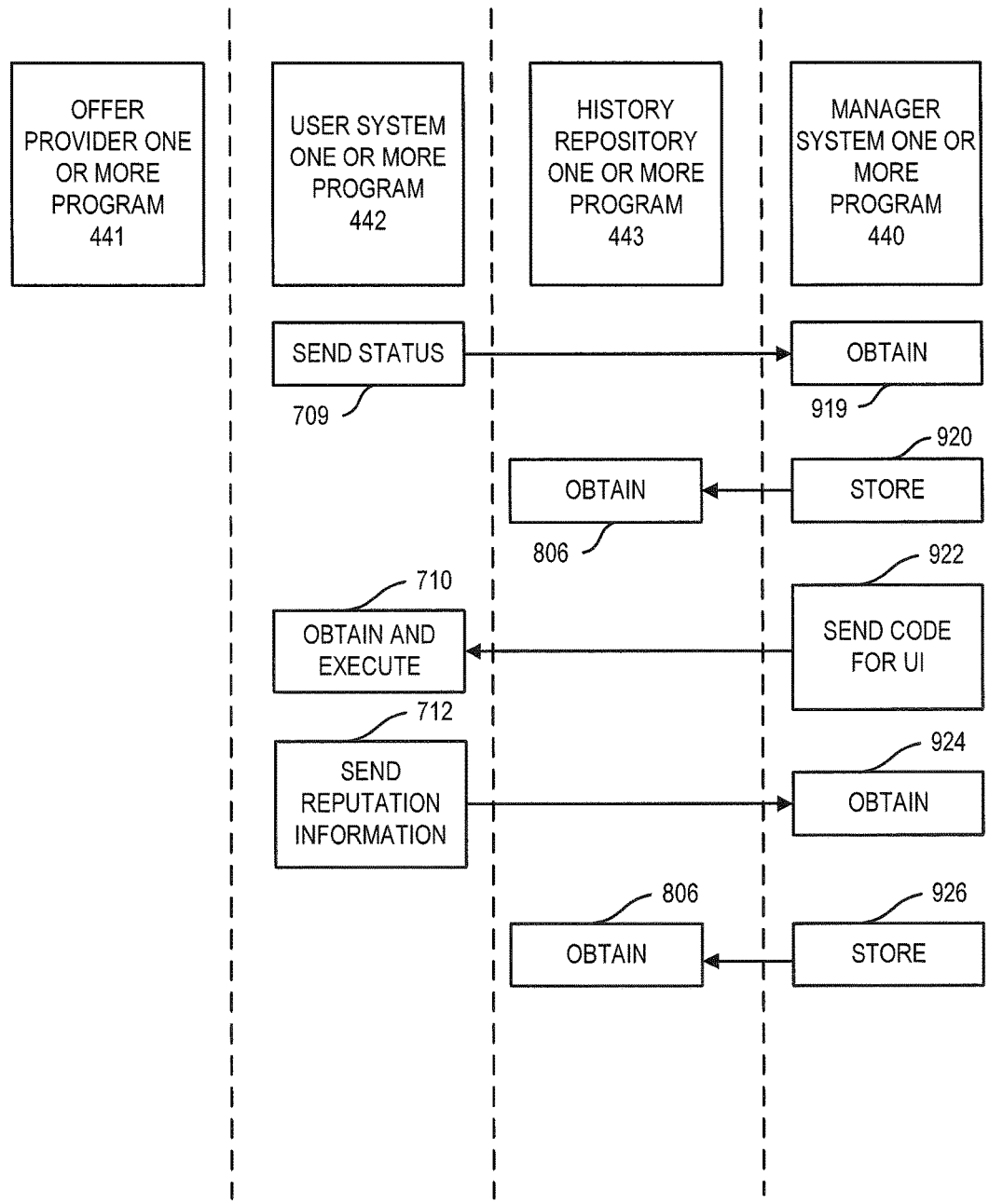

FIG. 11A-11B is a flow diagram illustrating further aspects of a method for augmenting content of a digital rights click through document in accordance with an embodiment as set forth herein. By way of explanation, in FIG. 11A-11B, method elements are illustrated from the point of view of a manager system one or more program 440 (e.g., running on manager system 410 of FIG. 4), offer provider one or more program 441, user one or more program 442 and history repository one or more program 443. While the flow diagram of FIG. 11A-11B depicts a relatively distributed computing environment, any distribution scheme for functions corresponding to those described in reference to the flow diagram of FIGS. 11A-11B can be selected. In one embodiment, functions corresponding to all of the functions described in reference to the flow diagram of FIG. 11A-11B can be performed by one or more program, e.g., one or more program 440 running on a single computing node 100 (FIG. 3).

In one embodiment, some or all of the one or more program 440, 442, 443 may run on a different collection of physical or virtual machines or processors, depending on the need for scalability of the system. In one embodiment, each of the one or more program 440, 442, 443 can run on a different computer node 100. In one specific example, each of the one or more program 441, 442, 443 can run on a single multi-processor computer system. In one specific example, each of the one or more program 441, 442, 443 can run on a single single-processor computer system. In another specific example, various portions of manager system one or more program 440 may run on different processors running on different computing nodes 100. In another specific example, various portions of offer provider one or more program 441 may run on different processors running on different computing nodes 100. In another specific example, various portions of user system one or more program 442 may run on different processors running on different computing nodes 100. In another specific example, various portions of history repository one or more program 443 may run on different processors running on different computing nodes 100.

By way of overview, FIG. 11A-11B illustrates, at least in part, one or more embodiment in which a click through document of a certain user can be examined.

In one embodiment, at decision block 702 user system one or more program 442 can wait for a web browsing session to be commenced, e.g., between one or more program 442 and offer provider one or more program 441. If a web browsing session has been commenced one or more program 442 can advance to decision block 704. At decision block 704 one or more program 442 can determine if a digital rights click through document has been accessed. If a digital rights click through document has been accessed one or more program 442 at block 706 can send a notification to manager system one or more program 440 which can obtain the notification at block 902.

Responsively to the notification one or more program 440 at block 904 can send a request to offer provider one or more program 441 currently running a browsing session with one or more program 442, the request being a request for click through document content. One or more program 441 can obtain the request at block 602 and at block 604 can send click through document content.

At block 906 one or more program 440 can obtain the click though document content. At block 908 one or more program 440 can commence an examination of the obtained document. At block 910 one or more program 440 can query history repository one or more program 443 to obtain content of digital rights history repository 416. One or more program 443 can responsively send the queried content and one or more program 440 at block 912 can obtain the content sent at block 804. Blocks 910-912 and blocks 802-804 can be repeated until sufficient content has been obtained from digital rights history repository 416 to perform an examination.

At blocks 910-914 one or more program 440 can perform an examining of a digital rights click through document of a certain user. As set forth herein an examining can include comparing the document to one or more prior document of digital rights history repository 416. As set forth herein an examining can include analyzing events of one or more document to determine event analysis results. Event analysis results can include, e.g., a summary of information on agree/reject events of a set of click through documents corresponding to a click through document being examined, or a summary of information on positive or negative feedback entry events of a set of click through documents corresponding to a click through document being examined. As set forth herein an examining can include examining to determine reputation information, e.g., of a document or of a user of system 400. At block 914 one or more program 440 can complete an examination.

At block 916 one or more program 440 can perform augmenting of content of a digital rights click through document by outputting information e.g., by triggering display or other output of information. One or more program 440 to trigger an output of information can establish program code to display information. At block 918 one or more program 440 can send program code that can be established at block 916 to user system one or more program 442.

At block 708 user system one or more program 442 can execute the code, e.g., to display a result of the examining on a display 24, 25 of a computing node 100 of user system 406. Based on an output provided by augmenting content a user can sign or reject the document. In one embodiment, one or more program 440 can restrict a user's actuation of an agree button of the document subject to examining In one embodiment the restricting can include precluding a display of a click through document agree button on a certain display without augmenting of content of a document providing display of information on the certain display. At block 709 one or more program 442 can send the signed/rejected status to one or more program 440 that can receive the status at block 919.

At block 920 one or more program 440 can store the digital rights click through document examined at blocks 908-914 into system 400. One or more program 440 in performing the store at block 920 can perform sending the content obtained at block 906, together with a status indication indicating the signed/rejected status of the document to one or more program 443 for storage into digital rights history repository 416 on being obtained by one or more program 443 at block 806. One or more program 440 for sending the content at block 920 for performing a store can perform sending for storing user information of the certain user of the document, e.g., as can be obtained with a login procedure, e.g., prior to block 702.

At block 922 one or more program 440 can output a reputation user interface (UI). At block 922 one or more program 440 can send program code for presentment of a reputation user interface to one or more program 442.

At block 710 user system one or more program 442 can obtain the code sent at block 406 and at block 710 can execute the program code to display the reputation user interface so that a reputation user interface can be displayed on a display 24, 25 of a computing node 100 of user system 406. A user can enter into the user interface information on the present click through document.

Figure 12:
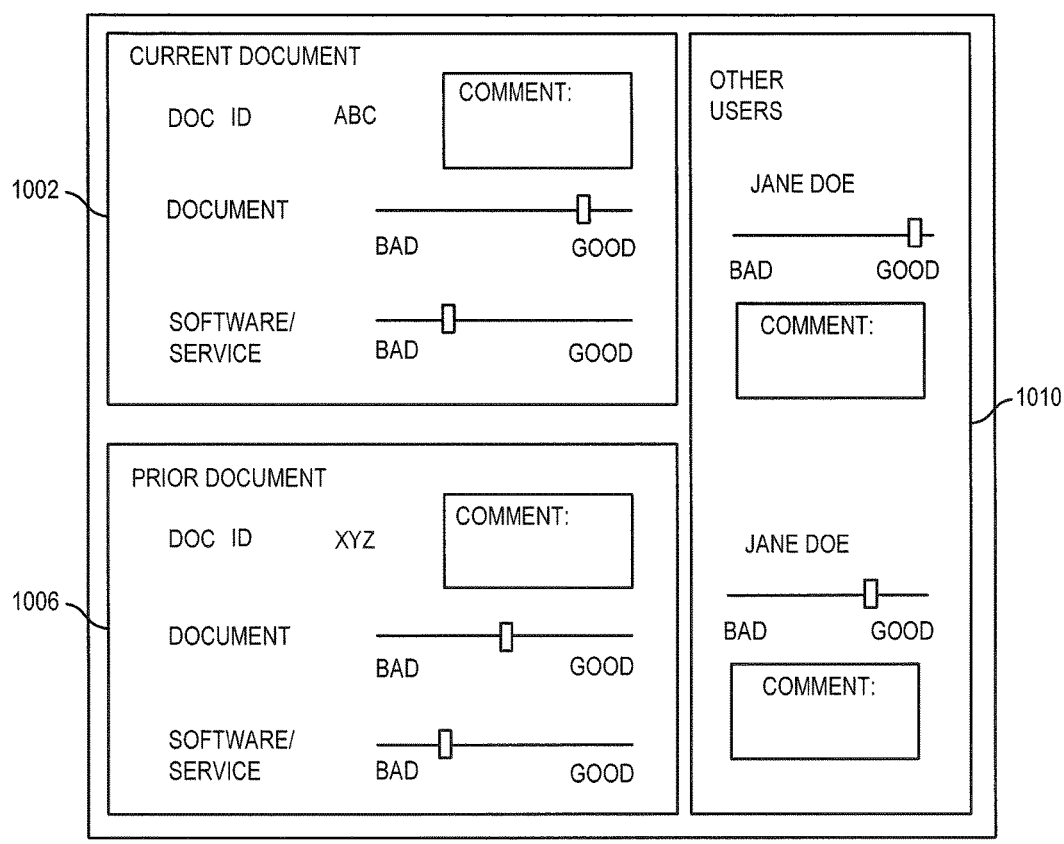
FIG. 12 is a reputation user interface in accordance with an embodiment as set forth herein.

An example of a reputation user interface is illustrated in FIG. 12 so that a user can enter feedback information into system 400. In area 1002 a user can enter reputation information of a document subject to examining at blocks 908-914. In area 1006 a user can enter reputation information of one or more prior document. It can be seen that a reputation information of a document as input by a user may change over time between logins of a user. Accordingly, it can be advantageous that a reputation user interface as illustrated in FIG. 12 prompt a user to enter reputation information on one or more prior document of digital rights history repository 416. In area 1010 a user can enter information on one or more other users of system 400, wherein each of the one or more other users is associated to one or more document of digital rights history repository 416. Like document reputation information user reputation information can change over time. Accordingly, it can be advantageous that a reputation user interface as shown in FIG. 12 prompt for user reputation information.

At block 924 one or more program 440 can obtain the reputation information. At block 926 one or more program 440 can store the obtained information, e.g., by sending the obtained reputation information to one or more program 443 which can obtain the reputation information at block 806 for storing of the reputation information into digital rights history repository 416.

Where information presented has been designated for sharing between personal repository 418 and crowdsource repository 420 one or more program 440 when sending information for storing can cause, e.g., via establishing appropriate program code, sharing of information between personal repository 418 and crowdsource repository 420. Referring to the flow diagram of FIGS. 11A-11B it will be seen that the functions described with reference to blocks 908-914 generally depict one or more program 440 performing block 510 (FIG. 5) in one embodiment, and further that the functions described with reference to block 916 generally depict one or more program 440 performing block 510 (FIG. 5) in one embodiment.

Figure 13:
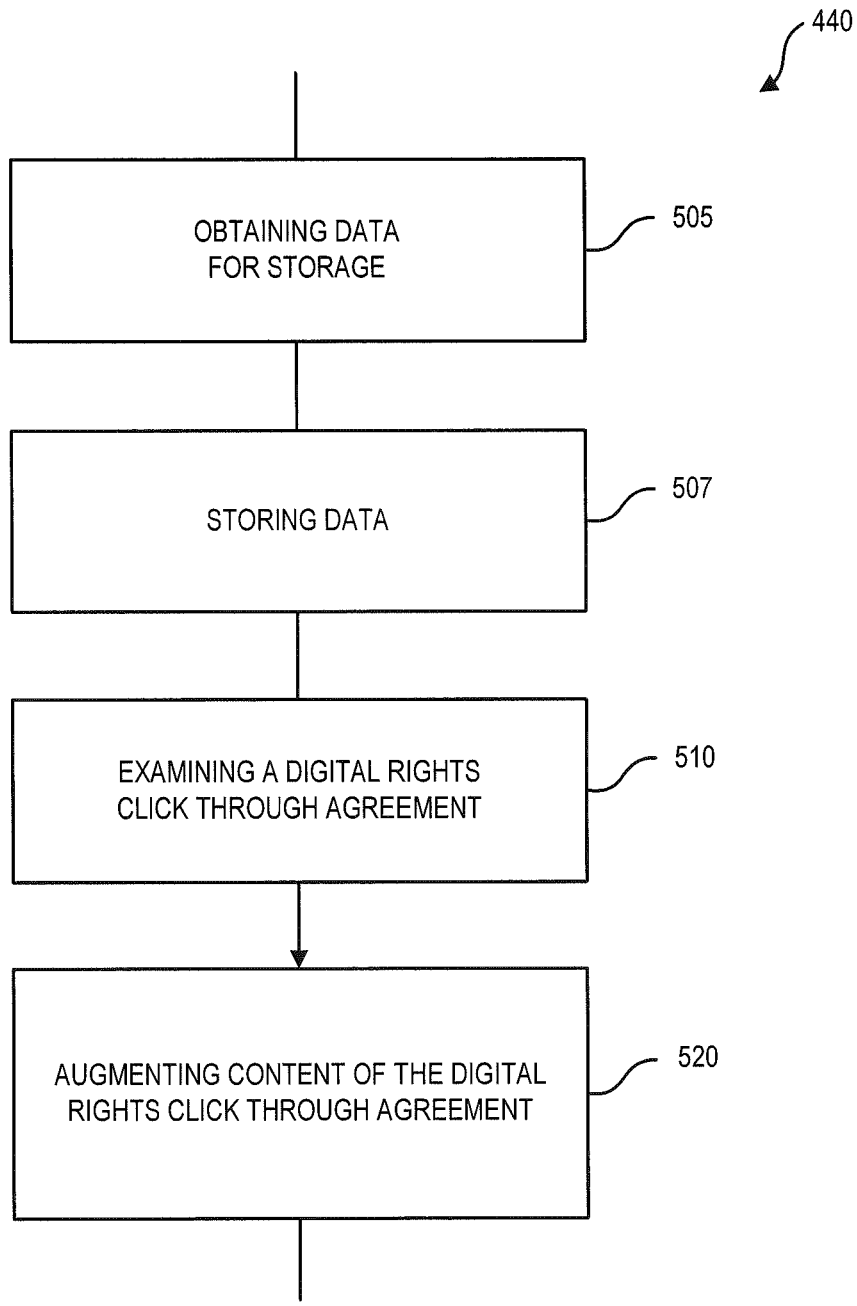
FIG. 13 is a flow diagram illustrating a method in accordance with an embodiment as set forth herein.

FIG. 13 is a flow diagram illustrating a method in accordance with an embodiment as set forth herein. In one embodiment, one or more program 440 at block 505 can perform obtaining data for storage into a digital rights history repository 416. In one embodiment one or more program 440 at block 507 can perform storing data into a digital rights history repository 416. In one embodiment one or more program 440 at block 510 can perform examining a digital rights click through document. In one embodiment one or more program 440 at block 520 can perform augmenting content of the digital rights click through document based on a result of the examining.

In one embodiment, where obtaining of data at block 505 involves obtaining of data from a plurality of users e.g., for storage into crowdsource repository 420, one or more program 440 obtaining data at block 5050 can include crowdsourcing of data. Crowdsourcing of data herein can include obtaining information by enlisting of services of a number of people, either paid or unpaid, via a computer network, such as an intranet, a local area network (LAN), or a wide area network (WAN) such as the Internet.

In one embodiment, one or more program 440 at block 405 for performing obtaining of data can perform crowdsourcing data from a plurality of users via a computer network, the data including feedback data regarding digital rights click through documents, wherein each of the users is a party to at least one of the digital rights click through documents as set forth herein. In one embodiment, one or more program 440 at block 507 for performing storing of data can perform storing the data obtained at block 505 into a digital rights history repository 416. In one embodiment one or more program 440 at block 510 can perform examining a digital rights click through document of a certain user, wherein the digital rights click through document controls access to a digital asset, wherein the examining includes using at least a portion of the feedback data from the digital rights history repository. In one embodiment, one or more program 440 at block 520 can perform augmenting content of the digital rights click through document based on a result of the examining.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" encompass relationships where an element is partially based on as well as relationships where an element is entirely based on. Forms of the term "defined by" encompass relationships where an element is partially defined by as well as relationships where an element is entirely defined by. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:
1. A method comprising:
 crowdsourcing, by one or more processor, data from a plurality of users via a computer network, the data including feedback data regarding digital rights click through documents, wherein each of the users is a party to at least one of the digital rights click through documents;

storing, by the one or more processor, the data obtained by the crowdsourcing into a digital rights history repository;

examining, by the one or more processor, a digital rights click through document of a certain user, wherein the digital rights click through document controls access to a digital asset, wherein the examining includes using at least a portion of the feedback data of the digital rights history repository and wherein the portion of the feedback data includes reputation information of a user of the plurality of users who is a party to at least one of the digital rights click through document; and augmenting, by the one or more processor, content of the digital rights click through document based on a result of the examining.

2. The method of claim 1, wherein the examining includes comparing content of the digital rights click through document to one or more prior digital rights click through document of the digital rights history repository.

3. The method of claim 1, wherein the examining includes using other user content of a crowdsource repository of the digital rights history repository, the other user content being obtained from one or more user other than the certain user.

4. The method of claim 3, wherein the other user content is selected from the group consisting of one or more prior digital rights click through document and one or more reputation information item.

5. The method of claim 1, wherein the examining includes performing machine learning.

6. The method of claim 1, wherein the augmenting includes outputting information resulting from the examining.

7. The method of claim 1, wherein the examining includes analyzing to determine event analysis results of one or more prior digital rights click through documents corresponding to the digital rights click through document, and wherein the augmenting including outputting the event analysis results.

8. The method of claim 1, wherein the examining includes examining to determine reputation information of one or more prior digital rights click through document corresponding to the digital rights click through document, and wherein the augmenting includes outputting the reputation information.

9. The method of claim 1, wherein the examining includes comparing content of the digital rights click through document to one or more prior digital rights click through document of the digital rights history repository, wherein the one or more prior digital rights click through document includes a prior digital rights click through document of a user other than the certain user, and wherein the augmenting includes outputting information resulting from the comparing.

10. The method of claim 1, wherein the digital rights history repository includes one or more prior digital rights click through document, the one or more digital rights click through document having an agreed to or not agreed to status.

11. The method of claim 1, wherein the digital rights history repository includes crowdsource information of a crowdsource repository, the crowdsource information selected from the group consisting of one or more digital rights click through document obtained from one or more user other than the certain user and one or more reputation information item obtained from one or more user other than the certain user.

12. The method of claim 1, wherein the augmenting includes information selected from the group consisting of (a) information on whether the digital rights click through document is a new digital rights click through document; (b) information on one or more difference between the digital rights click through document and one or more prior digital rights click through document of the certain user; and (c) information on one or more difference between the digital rights click through document and one or more prior digital rights click through document of one or more other user other than the certain user.

13. The method of claim 1, wherein the method includes restricting, by the one or more processor, an agree button of the digital rights click through document.

14. A computer program product comprising:
a computer readable storage medium readable by one or more processing circuit and storing instructions for execution by one or more processor for performing a method comprising:
crowdsourcing data from a plurality of users via a computer network, the data including feedback data regarding digital rights click through documents, wherein each of the users is a party to at least one of the digital rights click through documents;
storing the data obtained by the crowdsourcing into a digital rights history repository;
examining a digital rights click through document of a certain user, wherein the digital rights click through document controls access to a digital asset, wherein the examining includes using at least a portion of the feedback data of the digital rights history repository and wherein the portion of the feedback data includes evaluation feedback reputation information of prior digital rights click through documents received from users of the plurality of users other than the certain user; and
augmenting content of the digital rights click through document based on a result of the examining.

15. The computer program product of claim 14, wherein the examining includes comparing content of the digital rights click through document to one or more prior digital rights click through document of the digital rights history repository, wherein the one or more prior digital rights click through document includes a prior digital rights click through document of a user other than the certain user, and wherein the augmenting includes outputting information resulting from the comparing.

16. A system comprising:
a memory;
one or more processor in communication with the memory; and
program instructions executable by the one or more processor via the memory to perform a method, the method comprising:
crowdsourcing data from a plurality of users via a computer network, the data including feedback data regarding digital rights click through documents, wherein each of the users is a party to at least one of the digital rights click through documents;
storing the data obtained by the crowdsourcing into a digital rights history repository;
examining a digital rights click through document of a certain user, wherein the digital rights click through document controls access to a digital asset, wherein the examining includes using at least a portion of the feedback data of the digital rights history repository, wherein the portion of the feedback data includes reputation information of a user of the plurality of users who is a party to at least one of the digital rights click through document; and augmenting content of the digital rights click through document based on a result of the examining.

17. The method of claim 1, wherein the portion of the feedback data includes an agreed to or not agreed to status of a prior digital rights click through document.

18. The method of claim 17, wherein the agreed to or not agreed to status of one or more prior digital rights click through document is an agreed to or not agreed to status of a plurality of prior digital rights click through document of users other than the certain user.

19. The method of claim 17, wherein the agreed to or not agreed to status of one or more prior digital rights click through document is an agreed to or not agreed to status of a prior digital rights click through document of the certain user.

20. The system of claim 16, wherein the system is configured so that when a result of the examining is that there is no prior digital rights click through document corresponding to the digital rights click through document of the certain user, the certain user is permitted to agree to the digital rights click through document of the certain user.

* * * * *